United States Patent
Krishnan

(10) Patent No.: US 9,518,408 B1
(45) Date of Patent: Dec. 13, 2016

(54) ALTERNATE BACKUP ENTRY FOR VEHICLES

(71) Applicant: Ford Global Technologies, LLC, Dearborn, MI (US)

(72) Inventor: Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/718,448

(22) Filed: May 21, 2015

(51) Int. Cl.
| | |
|---|---|
| *E05B 81/82* | (2014.01) |
| *E05B 81/54* | (2014.01) |
| *B60R 25/01* | (2013.01) |
| *E05B 47/00* | (2006.01) |
| *B60K 35/00* | (2006.01) |
| *B60W 50/08* | (2012.01) |
| *E05B 81/86* | (2014.01) |

(52) U.S. Cl.
CPC ............ *E05B 81/82* (2013.01); *B60K 35/00* (2013.01); *B60R 25/01* (2013.01); *B60W 50/08* (2013.01); *E05B 47/0001* (2013.01); *E05B 81/54* (2013.01); *E05B 81/86* (2013.01); *E05B 2047/0087* (2013.01)

(58) Field of Classification Search
CPC .. E05B 81/82; E05B 81/86; E05B 2047/0087; G07C 9/0069; G07C 2009/00222; B60R 25/23; Y10T 70/7068
USPC ........................................ 307/10.4
See application file for complete search history.

(56) References Cited

U.S. PATENT DOCUMENTS

| | | | | |
|---|---|---|---|---|
| 4,206,491 A * | 6/1980 | Ligman | ................ | G07C 9/0069 307/10.4 |
| 5,497,641 A * | 3/1996 | Linde | ...................... | E05B 81/14 180/289 |
| 5,547,208 A * | 8/1996 | Chappell | ................. | E05B 77/12 180/281 |
| 5,783,994 A * | 7/1998 | Koopman, Jr. | ......... | B60R 25/24 307/10.4 |
| 6,056,076 A * | 5/2000 | Bartel | ..................... | E05B 77/48 180/167 |
| 6,271,745 B1 * | 8/2001 | Anzai | ................. | G07C 9/00563 340/5.23 |

(Continued)

FOREIGN PATENT DOCUMENTS

| | | |
|---|---|---|
| DE | 4403655 A1 * | 8/1995 |
| EP | 0372791 A2 | 6/1990 |

(Continued)

OTHER PUBLICATIONS

JPO machine translation of JP 6-185250 (original JP document published Jul. 5, 1994).*

*Primary Examiner* — Behrang Badii
*Assistant Examiner* — David Testardi
(74) *Attorney, Agent, or Firm* — Jason C. Rogers; Price Heneveld LLP

(57) ABSTRACT

A door latch system for doors of motor vehicles includes an input device such as a keypad and a backup electrical power supply to unlock the door latch in the event the primary power supply fails, thereby eliminating the need for a lock cylinder. The door latch system is configured to supply electrical power from the primary electrical power supply to unlock the latch upon receiving a signal from a mobile phone, and to supply electrical power from the backup electrical power supply to unlock the latch if an authorized code is input via the keypad.

20 Claims, 5 Drawing Sheets

(56) References Cited

U.S. PATENT DOCUMENTS

| | | | | |
|---|---|---|---|---|
| 6,606,492 B1* | 8/2003 | Losey | B60Q 3/0293 | 307/10.2 |
| 6,883,839 B2 | 4/2005 | Belmond et al. | | |
| 6,914,346 B2* | 7/2005 | Girard | E05B 77/12 | 307/10.1 |
| 7,106,171 B1* | 9/2006 | Burgess | B60R 25/23 | 340/10.42 |
| 7,224,259 B2 | 5/2007 | Belmond et al. | | |
| 7,642,669 B2 | 1/2010 | Spurr | | |
| 8,126,450 B2* | 2/2012 | Howarter | B60R 25/2009 | 455/420 |
| 8,534,101 B2 | 9/2013 | Mette et al. | | |
| 2002/0121967 A1* | 9/2002 | Bowen | B60Q 1/52 | 340/425.5 |
| 2004/0124708 A1* | 7/2004 | Giehler | B60R 25/246 | 307/10.5 |
| 2008/0224482 A1 | 9/2008 | Cumbo et al. | | |
| 2009/0145181 A1* | 6/2009 | Pecoul | E05B 81/86 | 70/237 |
| 2010/0052337 A1* | 3/2010 | Arabia, Jr. | E05B 81/82 | 292/216 |
| 2011/0203336 A1* | 8/2011 | Mette | E05B 47/0611 | 70/277 |
| 2014/0088825 A1* | 3/2014 | Lange | E05B 81/64 | 701/36 |
| 2014/0200774 A1* | 7/2014 | Lange | E05B 77/54 | 701/49 |
| 2014/0242971 A1* | 8/2014 | Aladenize | G07B 15/00 | 455/420 |
| 2014/0338409 A1* | 11/2014 | Kraus | E05B 81/76 | 70/278.1 |
| 2014/0347163 A1 | 11/2014 | Banter et al. | | |
| 2015/0001926 A1* | 1/2015 | Kageyama | B60R 16/033 | 307/10.1 |
| 2016/0060909 A1* | 3/2016 | Krishnan | E05B 81/80 | 292/194 |

FOREIGN PATENT DOCUMENTS

| | | | | |
|---|---|---|---|---|
| EP | 694664 A1 * | 1/1996 | | |
| GB | 2402840 A * | 12/2004 | | B60R 25/04 |
| GB | 2496754 A | 5/2013 | | |
| JP | 06167156 A * | 6/1994 | | |
| JP | 06185250 A * | 7/1994 | | |
| JP | 2000064685 A | 2/2000 | | |
| WO | 0123695 A1 | 4/2001 | | |

* cited by examiner

ALTERNATE BACKUP ENTRY FOR VEHICLES

FIELD OF THE INVENTION

The present invention generally relates to door locks for motor vehicles, and more particularly to a powered door lock system that can be actuated utilizing wireless device such as a cell phone or the like, wherein the system includes a backup power supply and keypad that eliminates the need for an exterior lock cylinder and key.

BACKGROUND OF THE INVENTION

Driver's doors of motor vehicles typically include a door latch that selectively retains the door in a closed position. The latch may include a door lock system that includes a lock cylinder that is accessible from the exterior of the vehicle door. The door may also include a powered door lock that can be actuated utilizing an interior switch or a remote wireless fob. If the wireless remote fob malfunctions, a user can typically still gain access by inserting a key into the lock cylinder to mechanically unlock the driver's door lock. However, the use of mechanical lock cylinders, keys, and linkages tends to add to the complexity and cost of the vehicle.

SUMMARY OF THE INVENTION

One aspect of the present invention is a door latch system for doors of motor vehicles. The door latch system includes a door latch having a powered lock that is configured to be operably connected to a first electrical power supply. The powered lock defines locked and unlocked conditions. The latch is released upon movement of an exterior door handle when the powered lock is unlocked, and the latch does not release upon movement of an exterior door handle when the powered lock is locked. The door latch system further includes a first electrical power supply, and a controller operably connected to the powered lock. The controller is configured to receive an unlock command signal from a wireless cellular device. The door latch system further includes a backup device having a second electrical power supply that is configured to be operably connected to the powered lock. The system also includes a user input feature such as a keypad or the like that is configured to be mounted to a vehicle door, and to communicate with the controller and with the backup device. The keypad is operably connected to the first and second electrical power supplies. The keypad includes a plurality of discrete input features that can be utilized to input a security code. The controller is configured to unlock the powered lock utilizing electrical power from the first electrical power supply if an authorized security code is input using the keypad, or if the controller receives an unlock command signal from a wireless cellular device. The door latch system is configured to cause the backup device to unlock the powered lock utilizing electrical power from the second electrical power supply if a user inputs an authorized security code utilizing the keypad.

Another aspect of the present invention is a powered door latch including a latch having an electrically powered lock. The powered door latch further includes a controller, a user input device such as a keypad or the like, and first and second electrical power supplies. The controller is configured to actuate the electrically powered lock utilizing power from the second electrical power supply if the first electrical power supply fails and if an authorized code is entered using the keypad, or if the controller receives a wireless signal from a mobile wireless device such as a mobile phone.

Another aspect of the present invention is a door latch system for doors of motor vehicles. The keyless door latch system includes a door latch and a powered lock that selectively prevents unlatching of the door latch when the powered lock is in a locked state. The door latch system further includes a wireless receiver that is operably connected to at least a selected one of the first and second control modules. The wireless receiver is configured to receive an unlock signal from a mobile phone. The powered door latch further includes a user input device such as a keypad or other suitable device that is operably connected to the first and second control modules. The door latch system is configured to supply electrical power from the first electrical power supply to the powered lock to unlock the powered lock if the wireless receiver receives an unlock signal from a mobile wireless device such as a mobile phone. The door latch system is also configured to supply electrical power from the second electrical power supply to unlock the powered lock if an authorized combination is entered on the keypad.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
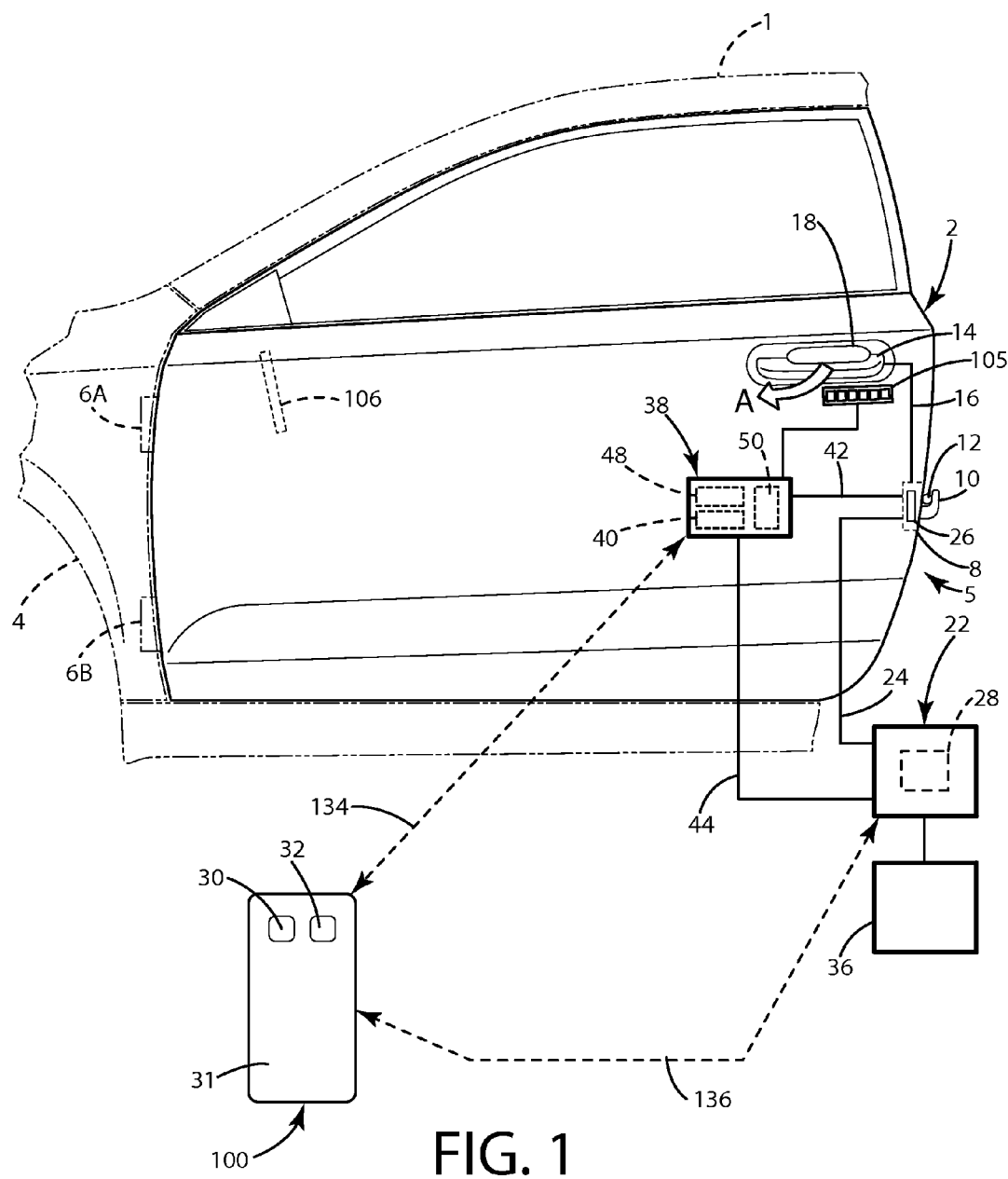
FIG. 1 is a partially schematic side elevational view of a vehicle door including a latch and powered lock system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. patent application Ser. No. 14/468,634, filed on Aug. 26, 2014, entitled "KEYLESS VEHICLE DOOR LATCH SYSTEM WITH POWERED BACKUP UNLOCK FEATURE," the entire contents of which are incorporated herein by reference.

With reference to FIG. 1, a motor vehicle 1 includes a driver's side door 2 that does not have a lock cylinder of the type that receives a key to mechanically unlock the door 2. Door 2 is movably mounted to a vehicle structure 4 by hinges 6A and 6B. A latch system 5 includes a latch 8 that includes a movable latch member 10 that selectively engages a striker 12 to retain the door 2 in a closed position. Latch 8 also includes a powered lock 26. The latch 8 may be operably connected to a movable exterior door handle 14 by mechanical linkage 16. The linkage 16 may comprise elongated link members, a cable, or other suitable mechanical connection. If the powered lock 26 of door 2 is in an unlocked state, a user can move the handle 14 as indicated by the arrow "A" to thereby cause the latch 8 to unlatch, permitting the door 2 to be opened. Specifically, latch 8 may include a pawl (not shown) of a known configuration that selectively retains the latch member 10 in a latched position. When the latch 8 of door 2 is unlocked, movement of the handle 14 causes the pawl to shift to a released position, thereby allowing movement of latch member 10 whereby the latch member 10 disengages from striker 12 as door 2 is pulled open. However, if the powered lock 26 of latch 8 is in a locked state, movement of the handle 14 does not release the pawl, such that the movable latch member 10 remains in an engaged position relative to striker 12, thereby preventing opening of the door 2. The basic operation of latch 8 and powered lock 26 as just described is well known to those skilled in the art, such that a more detailed description concerning the operation of the pawl, latch member 10, striker 12, and powered lock 26 is not believed to be required.

The keyless latch system of the present invention includes a control module 22 that is operably connected to the latch 8 by a conductive line 24 or the like. Control Module 22 may comprise a main control module of motor vehicle 1, or it may comprise a "dedicated" door latch/lock control module. Lock 26 may comprise an electrically powered lock that is operably connected to the control module 22. The powered lock 26 is operably connected to a main vehicle power supply such as a battery 36. A mobile wireless device such as a cell phone ("smart phone") 100 may include software (an "App") that provides an input feature such as an icon 30 on touchscreen 31 of cell phone 100. Pushing/contacting icon 30 causes cell phone 100 to generate wireless signal 136 that is received by receiver 28 of control module 22, and the control module 22 then causes powered lock 26 to receive power from main (first) vehicle battery 36 to unlock the latch 8.

Driver's door 2 includes a backup module 38 that optionally includes a second receiver 40 that is configured to receive a second wireless signal 134 that is generated by the cell phone 100 upon actuation of an optical second input feature such as icon 32. The backup module 38 includes a controller or circuit arrangement 50 that causes electrical power from a backup (second) power supply 48 to be supplied to powered lock 26 through an electrical line 42 when second wireless signal 134 is received by second receiver 40. Alternatively, the latch system 5 may be configured such that backup module 38 does not include a receiver 40. In this case, control module 22 is configured to utilize power from backup power supply 48 to actuate/unlock lock 26 if controller 22 receives a signal 134 and if main power supply 36 has failed.

As discussed in more detail below, the system may also be configured to unlock powered lock 26 utilizing power from backup power supply 48 if an authorized code (combination) is entered using an input feature such as keypad 105. The backup (second) power supply 48 may comprise a battery, capacitor, or other suitable power supply. As discussed in more detail below, backup (second) power supply 48 provides for unlocking of powered lock 26 even if main (first) power supply 36 fails. Furthermore, the backup power supply 48 may be operably connected to control module 22 and/or main vehicle battery 36 to recharge backup power supply 48 if required.

Figure 2:
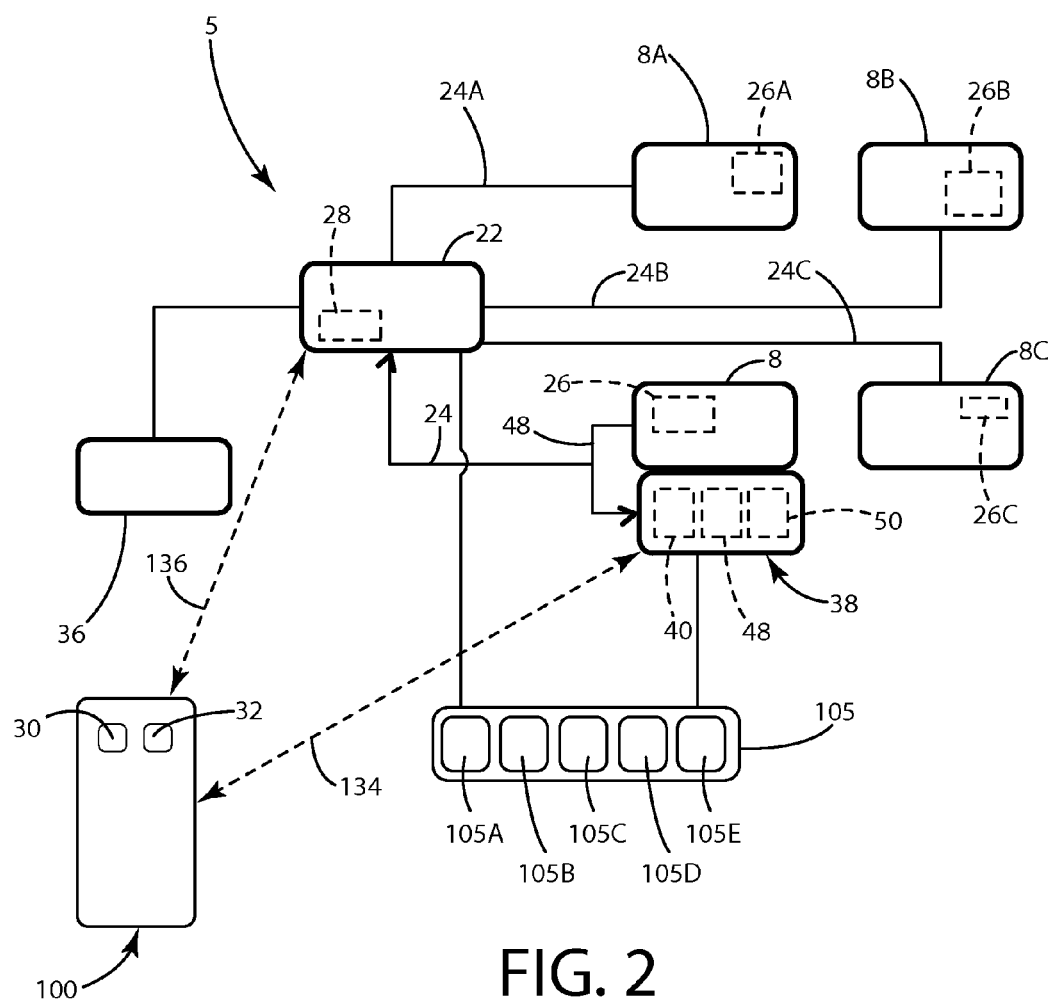
FIG. 2 is a schematic drawing of a latch and powered lock system according to one aspect of the present invention.

With further reference to FIG. 2, control module 22 may also be connected to right hand front latch 8A by a line 24A. Similarly, the control module 22 may be connected to a right rear latch 8B by a line 24B, and a left rear latch 8C by a line 24C. One or more interior switches (not shown) may be operably connected to the control module 22 whereby occupants of the vehicle can actuate the switches, thereby causing the control module 22 to supply power from battery 36 to the powered locks 26, 26A, 26B, and 26C of door latches 8, 8A, 8B, and 8C, respectively, in a manner that is generally known in the art.

Figure 3:
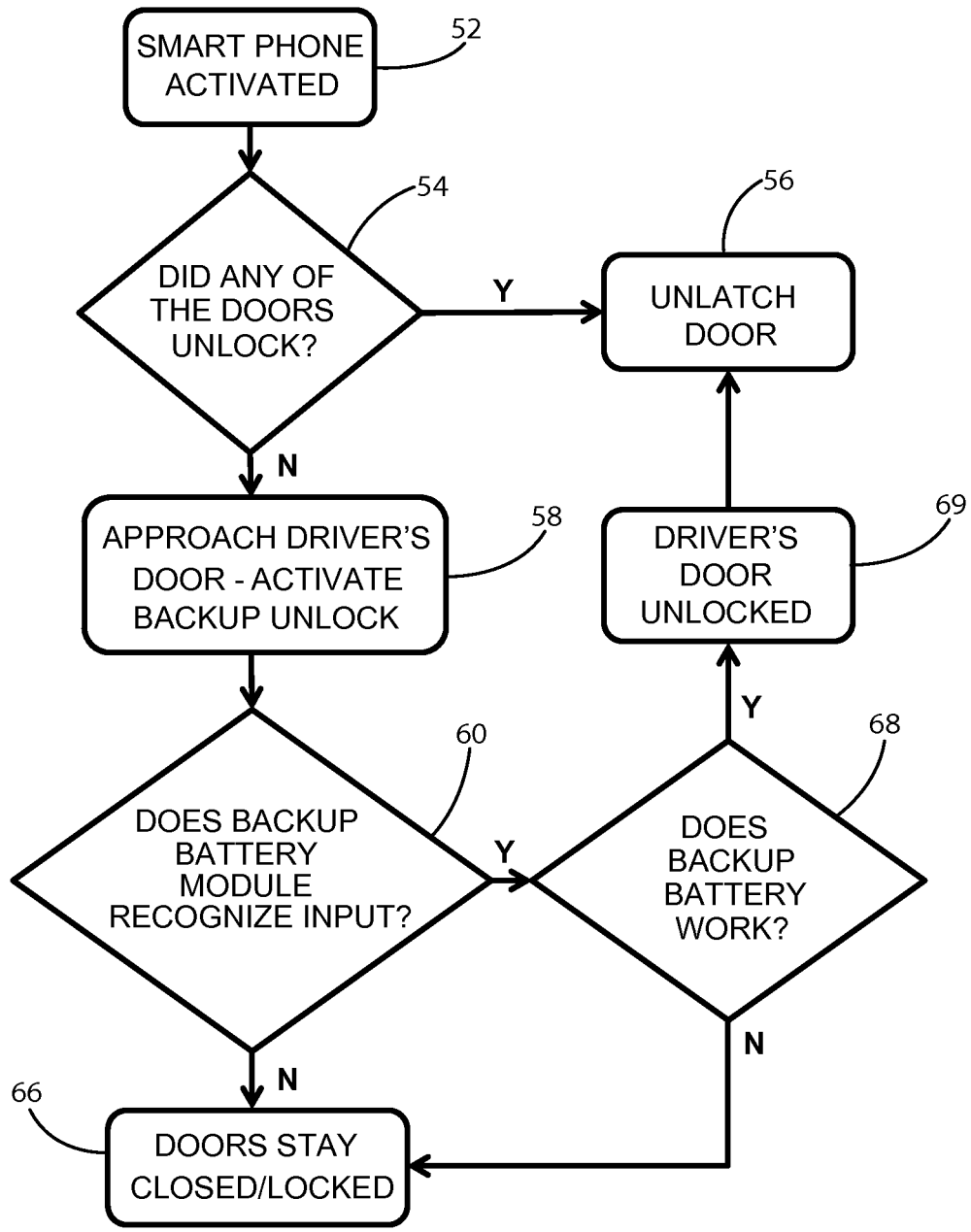
FIG. 3 is a flow chart showing operation of a door latch and powered lock according to one aspect of the present invention.

With further reference to FIG. 3, during operation the cell/smart phone 100 may be actuated as indicated by the step 52 to generate a wireless "unlock" command. In step 52, the first input feature/icon 30 (FIGS. 1 and 2) may be actuated to generate a first wireless signal 136 to the control module 22. At step 54, control module 22 determines if any of the locks 26-26C of latches 8-8C of the doors of the vehicle unlocked. If any of the doors did unlock, a user moves handle 14 and unlatches the door at step 56. If none of the doors unlock, a user may then actuate the second input 32 to activate the backup module 38 as shown at step 58. Alternatively, at step 58, a user may input a security code utilizing keypad 105 to thereby unlock the door.

Referring again to FIG. 3, backup module 38 determines if second wireless signal 134 or the keypad entry is recognized. If the backup module 38 does not recognize the second signal 134 or the keypad entry, the powered lock 26 remains locked as shown at step 66. If the second wireless signal 134 or keypad entry is recognized by the backup module 38 at step 60, and if the backup power supply 48 has sufficient power (step 68), the backup module 38 supplies power from backup power supply 48 to the powered lock 26 to thereby unlock the driver's door at step 69. This allows a user to unlatch the door at step 56 by grasping and pulling on handle 14.

Figure 4:
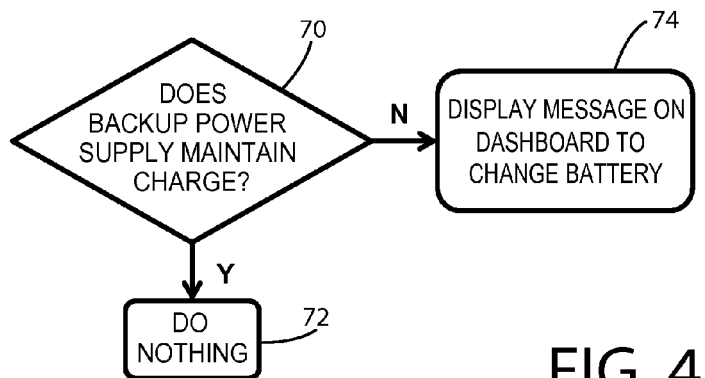
FIG. 4 is a flow chart showing battery recharge of the door lock system according to another aspect of the present invention.

With further reference to FIG. 4, the latch system 5 may be configured to recharge the backup power supply 48 if required. The control module 22 and/or backup module 38 may be configured to monitor the rechargeable backup power supply 48 as shown at step 70 of FIG. 4. If the backup power supply 48 does maintain a proper charge according to predefined criteria, the control module 22 and/or backup module 38 do not take any action as shown at step 72. In the event the backup power supply 48 does not maintain a proper charge at step 70, control module 22 and/or backup module 38 cause a message to be displayed on the vehicle dashboard indicating that the battery or backup power supply 48 must be changed/serviced as shown at step 74.

Figure 5:
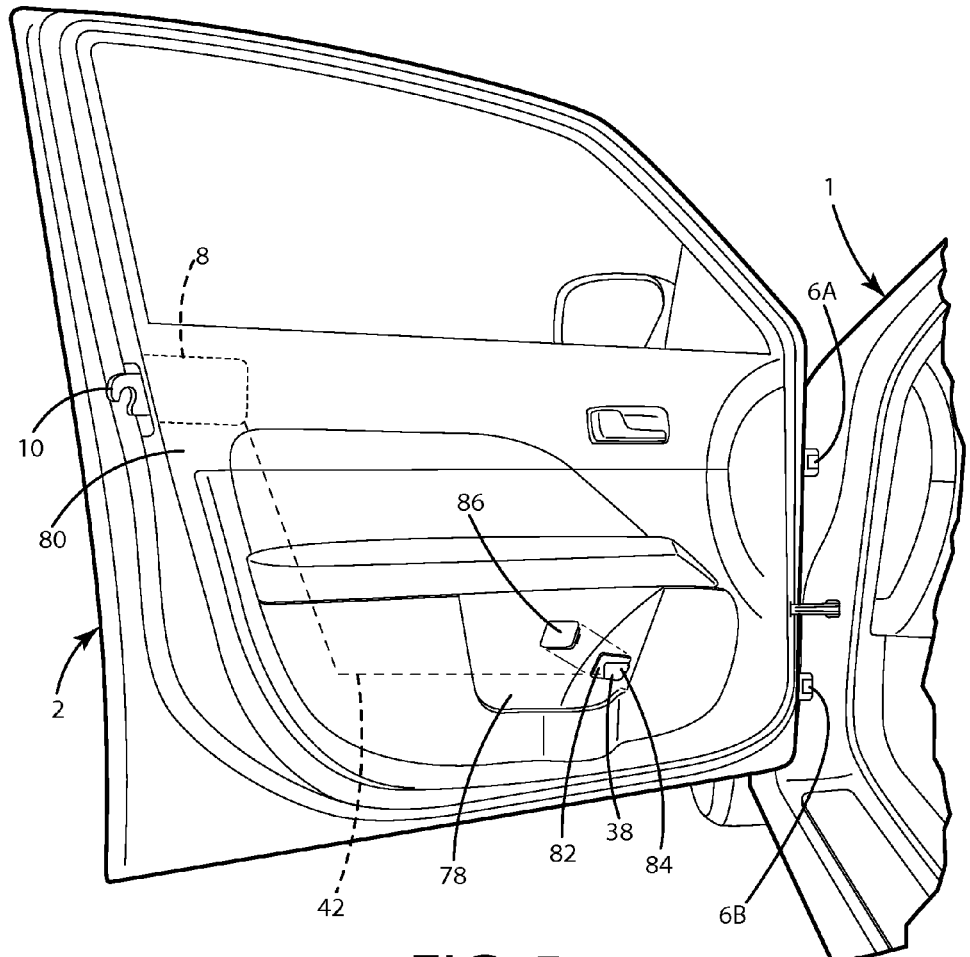
FIG. 5 is a partially fragmentary perspective view showing an interior of a vehicle door.

With further reference to FIG. 5, vehicle door 2 may include a map pocket 78 on an inner side 80 of door 2. The backup module 38 may be mounted in a cavity 82 that is accessible through an opening 84 in map pocket 78. A cover 86 may be removably attached to the door 2 to selectively close off opening 84. The opening 84 provides access to the backup module 38 to permit servicing and/or replacement of backup module 38, and to permit replacement of backup power supply 48 of backup module 38 as may be required. It will be understood that the arrangement of FIG. 5 is merely an example of a suitable location and mounting arrangement for the backup module 38. Alternatively, the backup module 38 may be mounted in an interior space of door 2 adjacent the exterior handle 14 (FIG. 1), whereby the backup module 38 is accessible by removing an exterior bezel 18 (FIG. 1).

Significantly, the latch system 5 eliminates the cost and complexity associated with conventional door lock cylinders and keys. Conventional door lock cylinders may take up significant space within vehicle doors, and the lock cylinder and associated linkage may need to be specifically designed for a particular vehicle door. In contrast, the backup module 38 may comprise a compact unit that can be mounted at numerous locations within the vehicle door 2. Because the backup module 38 can be operably connected to the latch 8 by an electrical line 42, specially designed mechanical linkage for a lock cylinder is not required in the latch system 5 of the present invention.

Referring again to FIGS. 1 and 2, it will be understood that the mobile phone 100 may comprise a "smart phone," tablet, portable computer, or other wireless communication device. Mobile phone 100 is typically configured to utilize digital wireless cellular communication, WiFi, BLU-ETOOTH®, or other wireless communication technologies. The mobile phone 100 communicates with receiver 28 and/or receiver 40 of control modules 22 and 38, respectively. The wireless signals 134 and 136 may comprise one way signals that are transmitted from mobile phone 100 to the receivers 28 and 40. Alternatively, the receivers 28 and 40 may comprise transceivers and the wireless signals 134 and 136 may comprise two way signals that permit two way communications between mobile phone 100 and receivers 28 and 40. In the illustrated example, the control modules 22 and 38 each have a separate receiver. However, it will be understood that a single receiver 28 may be operably connected to control module 22 and control module 38. It will be understood that receiver 28 could be integrated with module 22, or it may be mounted in a separate location and be operably connected to module 22 and/or module 38 utilizing conductive lines.

Mobile phone 100 may include a touchscreen 31 and software (an "App") that permits a user to cause the mobile phone 100 to generate a wireless unlock command signal. The unlock signal may comprise a unique security code, and the control modules 22 and/or 38 may be configured to unlock the door 2 only if an authorized unlock signal is recognized. Upon receiving an unlock signal from mobile phone 100, the controller 22 or controller 38 causes the powered lock 26 to unlock utilizing power from the main vehicle battery 36 or from backup power supply 48. The latch system 5 may be configured to utilize the main vehicle battery 36 to unlock the powered lock 26 if the main battery 36 is functioning properly. In the event the main power supply 36 is not functioning properly, the latch system 5 may be configured to utilize the backup (second) power supply 48.

As shown in FIGS. 1 and 2, the powered latch system 5 may also include a user authentication device such as a keypad 105. The keypad 105 may include a plurality of discrete inputs such as pads or buttons 105A-105E. Alternatively, keypad 105 may comprise a touch screen or other suitable device having one or more inputs that provide for entry of a security code. Keypad 105 could also comprise a biometric device such as a fingerprint reader, retina I.D. device or the like. The controllers 22 and/or 38 may be configured to actuate the powered lock 26 to unlock the latch system 5 if an authentication signal such as a specific sequence/combination of inputs is input utilizing the pads/buttons 105A-105E of keypad 105. The latch system 5 may be configured to permit a user to provide a unique security sequence or code ("PIN") that must be entered utilizing the keypad 105.

In the event the mobile phone 100 is inoperable due to the batteries of the mobile phone 100 being dead and/or other malfunction of mobile phone 100, a user can use keypad 105 to actuate the powered lock 26 to unlock the latch system 5.

Figure 6:
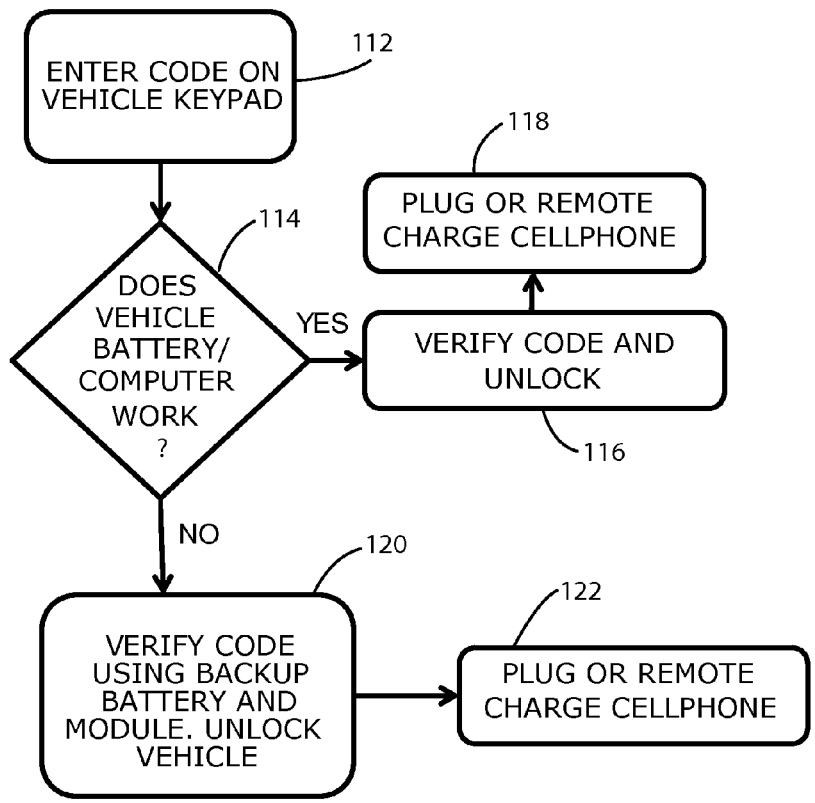
FIG. 6 is a flowchart showing operation of the vehicle keypad.

Operation of the keypad 105 is shown in FIG. 6. Keypad 105 may be utilized if the batteries of cell phone 100 are dead, or if cell phone 100 is not functioning properly. Specifically, at step 112, a user enters a code utilizing keypad 105. At step 114 the system determines if the main vehicle power supply 36 and/or main control module 22 are operational. If "yes," the system 5 (e.g. control module 22) verifies the code and causes the powered lock 26 to unlock utilizing power 36. A user can then plug or remote charge the cell phone as shown at step 118. Referring back to step 114, if the main vehicle power supply 36 and/or main control module 22 are not operational, at step 120 the backup module 38 verifies the code input utilizing keypad 105, and the powered lock 6 is unlocked utilizing power from the backup power supply 48. In general, the controller 50 of backup module 38 may be operated utilizing power from the backup power supply 48 in the event the main power supply 36 fails or is disconnected from the backup module 38. After the vehicle is unlocked, a user can plug or remote charge the cell phone 105 as shown at step 122 (e.g. charge the cell phone by connecting a charger to the vehicle's electrical system).

Figure 7:
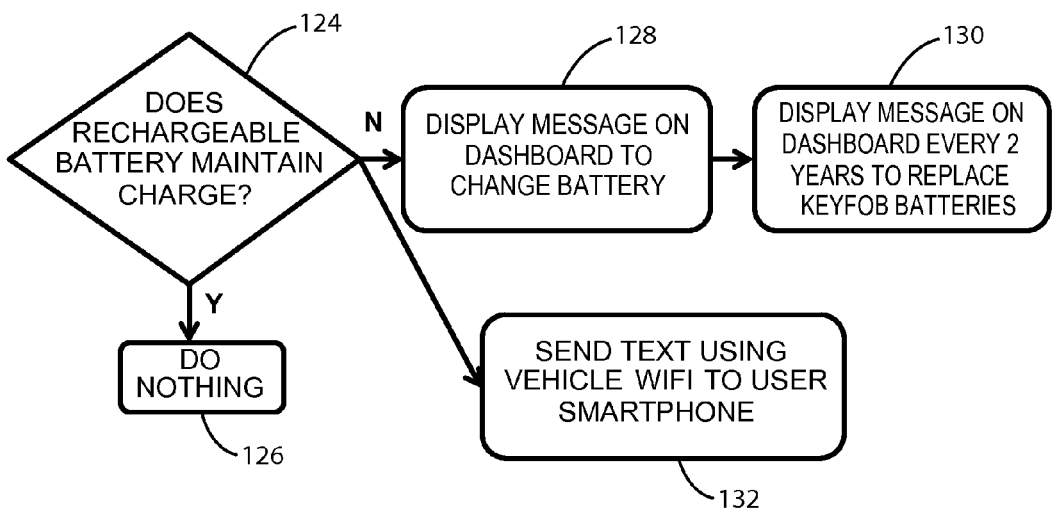
FIG. 7 is a flowchart showing a feedback loop that is utilized to monitor the health of the backup rechargeable battery.

With further reference to FIG. 7, the latch system 5 may be configured to monitor the status of the backup rechargeable battery 48 and alert a user if the backup (second) power supply 48 is malfunctioning. Specifically, at step 124 the main control module 22 and/or backup module 38 determine if the backup power supply 48 is maintaining a charge. If the backup power supply 48 is properly maintaining a charge according to predefined criteria, the system does nothing as shown at step 126. However, if the backup power supply 48 does not maintain a proper charge, an alert such as a text message can be sent to a mobile device such as the user's mobile phone 100 utilizing the Wi-Fi of the vehicle 1 and/or the receivers 28 and 40 (if the receivers 28 and 40 are configured to both transmit and receive wireless signals). Also, at shown at step 128, the system may be configured to display a message on a display screen 106 (FIG. 1) located inside the vehicle 1 in the event the backup power supply 48 does not maintain a proper charge. The message may be displayed on the dashboard continuously, or at predefined time intervals. As shown at step 130, the system may also be configured to display a message on the display screen 106 periodically (e.g. once a month, once a year or once every 2 years) to replace the batteries in a keyfob if the system includes a keyfob (not shown). It will be understood that the backup power supply 48 may be monitored utilizing the steps shown in FIG. 7 at periodic intervals (e.g. every 60 seconds, once every hour, once every 24 hours, etc.).

In addition to the unlock functions discussed above, the vehicle 1 may also be configured to permit operation of the vehicle 1 based on a signal received from mobile phone 100 and/or entry of an authorized code utilizing an authentication feature or device such as keypad 105. For example, vehicle 1 may be configured to include a keyless ignition whereby the vehicle can be operated if an authorized signal is received from a fob. If a user does not have a fob, or if the fob malfunctions, the user can unlock the powered lock 26 utilizing the mobile phone 100 or by using the keypad 105. Also, upon entering the vehicle 1, the user can operate the vehicle utilizing an authorized signal from the mobile phone 100 and/or by entering an authorized code utilizing the keypad 105. It will be understood that the display 106 located inside the vehicle may comprise a touch screen device that permits entry of an authorization code whereby a user can enter a code utilizing the display screen 106 to permit operation of the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door latch system for doors of motor vehicles, the door latch system comprising:
   a door latch including a powered lock that is configured to be operably connected to a first electrical power supply, the powered lock defining locked and unlocked conditions whereby the latch is released upon movement of an exterior door handle when the powered lock is unlocked, and wherein the latch does not release upon movement of an exterior door handle when the powered lock is locked;
   a first electrical power supply;
   an electronic controller operably connected to the powered lock, wherein the electronic controller is configured to receive an unlock command signal from a smart phone;
   a second electrical power supply configured to be operably connected to the powered lock; and
   a user input device operably connected to the first and second electrical power supplies, the user input device including at least one of a keypad mounted on a vehicle and a biometric device wherein the user input device can be utilized to input a security code, and wherein:
   the electronic controller is configured to unlock the powered lock utilizing electrical power from the first electrical power supply responsive to an authorized security code that is input using the user input device, and responsive to the controller receiving an unlock command signal from a smart phone, and wherein the door latch system is configured to cause the powered lock to be unlocked utilizing electrical power from the second electrical power supply responsive to an authorized security code that is input using the user input device.

2. The door latch system of claim 1, wherein:
   the electronic controller includes a receiver that is configured to receive a wireless signal from a smart phone.

3. The door latch system of claim 1, wherein:
   the user input device comprises a keypad.

4. The door latch system of claim 3, wherein:
   the keypad comprises a plurality of pushbuttons.

5. The door latch system of claim 1, wherein:
   the electronic controller is configured to transmit a wireless signal including information concerning the operation of the first electrical power supply.

6. The door latch system of claim 5, wherein:
   the electronic controller transmits a wireless signal responsive to the first electrical power supply malfunctioning according to predefined criteria.

7. The door latch system of claim 1, including:
   a display configured to be mounted in a vehicle;
   the electronic controller causes the display to display an alert responsive to the second electrical power supply malfunctioning according to predefined criteria.

8. The door latch system of claim 1, wherein:
   the electronic controller comprises a vehicle control module that is operably connected to the first electrical power supply and a backup control module that is operably connected to the second electrical power supply.

9. The door latch system of claim 1, wherein:
   the electronic controller is configured to alert a user when the second electrical power supply is not functioning properly.

10. The door latch system of claim 1, wherein:
    the electronic controller and second electrical power supply are in the form of modules configured to be mounted in a vehicle door.

11. The door latch system of claim 1, wherein:
    the electronic controller is configured to permit vehicle operation when the electronic controller receives a wireless signal from a cellular device.

12. A powered door latch comprising:
    a latch including an electrically powered lock;
    a controller configured to unlock the powered lock;
    a keypad operably connected to the controller and mounted to a vehicle; and
    first and second electrical power supplies providing power to the controller and to the keypad, wherein:
    the controller is configured to actuate the electrically powered lock utilizing power from the second electrical power supply when the first electrical power supply fails, responsive to an authorized code being entered using the keypad and responsive to a wireless signal being received by the controller from a mobile phone.

13. The powered door latch of claim 12, wherein:
    the controller comprises a vehicle control module and a backup control module that can be actuated utilizing the keypad when the vehicle control module does not actuate the electrically powered lock.

14. The powered door latch of claim 13, wherein:
    the vehicle control module is operably connected to the first electrical power supply, and the backup control module is operably connected to the second electrical power supply.

15. The powered door latch of claim 14, wherein:
    the vehicle control module and the backup control module are operably connected to the keypad.

16. The powered door latch of claim 12, wherein:
    the controller is configured to generate an alert signal to at least one of a display in a vehicle and a mobile device when the second electrical power supply fails to operate properly according to predefined criteria.

17. The powered door latch of claim 12, wherein:
    the first electrical power supply comprises a main vehicle battery;
    the second electrical power supply comprises a backup battery having sufficient electrical power to actuate the electrically powered lock when the main vehicle battery fails.

18. A door latch system for doors of motor vehicles, the door latch system comprising:

a door latch;

a powered lock that selectively prevents unlatching of the door latch when the powered lock is in a locked state;

first and second control modules having first and second electrical power supplies, respectively;

a wireless receiver operably connected to at least a selected one of the first and second control modules, wherein the wireless receiver is configured to receive an unlock signal from a mobile phone; and a user authentication device mounted to a vehicle and operably connected to the first and second control modules; and wherein:

the door latch system is configured to supply electrical power from the first electrical power supply to the powered lock to unlock the powered lock when the wireless receiver receives an unlock signal from a mobile phone, and wherein the door latch system is configured to supply electrical power from the second electrical power supply to unlock the powered lock when the user authentication device is actuated by an authenticated user according to predefined criteria.

19. The door latch system of claim 18, wherein the user authentication device comprises a keypad.

20. The door latch system of claim 18, wherein:

the user authentication device comprises a biometric device.

\* \* \* \* \*